J. DODDER.
Wagon-Wheel Tire.
No. 93,973. Patented Aug. 24, 1869.
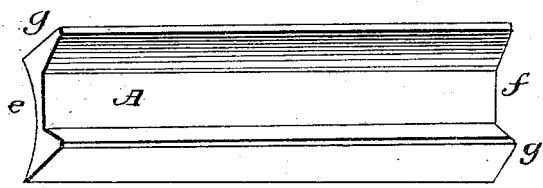
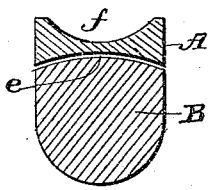
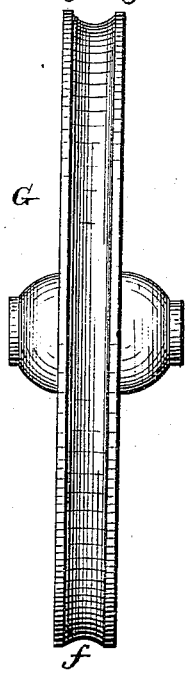
Witnesses:
D. C. Colby
John H. Holden
Inventor:
Jacob Dodder
R. H. Marsh Atty

UNITED STATES PATENT OFFICE.

JACOB DODDER, OF WASHINGTON, IOWA.

IMPROVED WAGON-TIRE.

Specification forming part of Letters Patent No. 93,973, dated August 24, 1869.

*To all whom it may concern:*

Be it known that I, JACOB DODDER, of Washington, Washington county, Iowa, have invented a new and useful Improvement in Tire-Bars for Wagon and Carriage Wheels; and I do hereby declare the following to be a full and exact description of the same, reference being had to the drawings that accompany and form a part of this specification.

The object of my invention is so to fashion or form the tire on its inner surface that it shall hold more firmly to the felly than when a plane surface is used, and a further object is so to form the outer surface of the said tire that it shall present less surface than the width thereof to the road or a hard track, and an increased surface on a sandy or loose track, for purposes more fully explained hereinafter.

Figure 1 represents a portion of my improved tire-bar prepared for the wheel; Fig. 2, section of felly and tire; Fig. 2, wheel bearing my improved tire.

Letter A represents the tire-bar; B, the felly; C, the wheel; e, concave surface of tire on its inner side; f, concave surface on outer edge or periphery. g g represent very narrow plane surfaces on the periphery of the tire when set, the concavity not occupying the entire width thereof. This is preferable to the form given in Fig. 1.

It is well known that the fellies of wheels split or open in seams often where the spoke enters. This appears to result from the continued concussion upon the wheel by fast driving on stony roads. My object in giving a concave surface to the inner bearing of the tire where it clasps the wheel is to protect the felly, as well as to prevent the tire from being wrenched off. By giving to the outer face the form represented in Fig. 1, or that in Fig. 2, I cause the wheel to run very light, and with very little noise on a hard road, and when on a soft, loose, or sandy road the sand, instead of being divided, as it is by a rounded surface, will be compressed in the concavity formed on the periphery of the wheel, which will sink less deep, and thus relieve the team or lighten the draft. Still further, great annoyance, much danger, and sometimes injury to horse and carriage and occupants of the latter result from the carriage's lateral motion, or sliding sidewise, on turning a corner or the like, and this sliding is due to the rounded surface of the tire on the wheel. The provision I make by forming the outer face as shown in Figs. 1 and 2 remedies all this, and is of great advantage. Besides, the wheel, with this device, is less likely to fall into a rut in the road, and, if it does, will more readily rise out of it.

My invention, then, consists in forming the tire-band with two concave surfaces or grooves running the entire circuit thereof, one upon the inner face, embracing the entire face, the other upon the outer face, embracing nearly the entire face, as illustrated in Fig. 2.

What I claim as of my invention, and desire to secure by Letters Patent, is—

A tire-band for wheels of carriages and other vehicles, having both the outer and inner surfaces concave, as and for the purposes set forth.

JACOB DODDER.

Attest:
A. H. PATTERSON,
I. RHEINHART.